Dec. 10, 1935. F. RIEBEL, JR., ET AL 2,023,902
SUCTION CLEANER CURRENT SUPPLY MECHANISM
Filed April 27, 1932
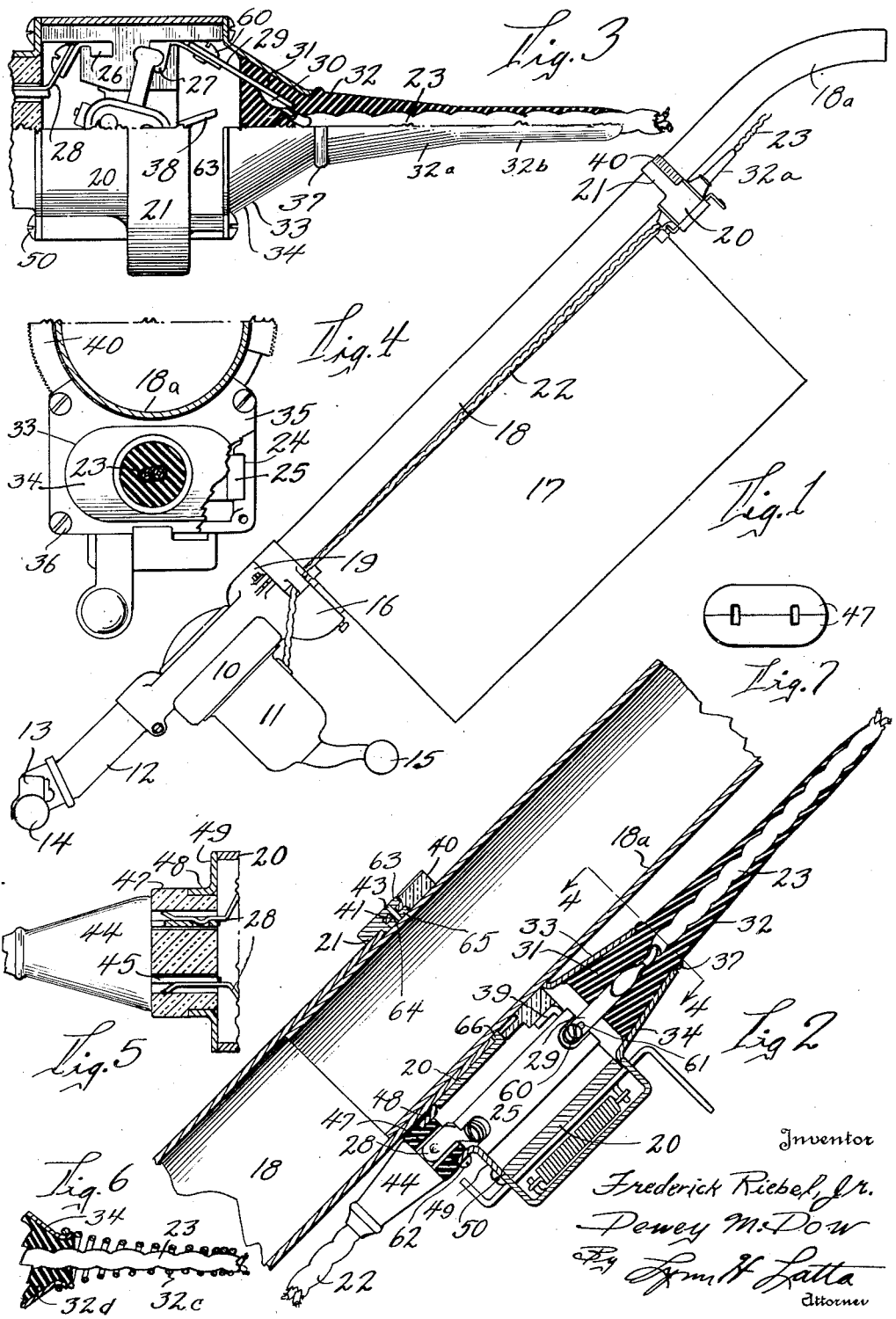

Patented Dec. 10, 1935

2,023,902

UNITED STATES PATENT OFFICE 2,023,902

SUCTION CLEANER CURRENT SUPPLY MECHANISM

Frederick Riebel, Jr., and Dewey M. Dow, Toledo, Ohio, assignors to Air-Way Electric Appliance Corporation, Toledo, Ohio, a corporation of Delaware Application April 27, 1932, Serial No. 607,794

8 Claims. (Cl. 173—324)

Our invention relates to suction cleaners and has for its object to provide improvements in the motor cord, switch, and current supply cord assembly of such a cleaner.

A particular object of the present invention is to provide a very strong strain relief connection between the current supply cord and the switch assembly of a cleaner embodying a switch casing rigidly and securely attached to its handle, whereby rough usage will not loosen or interfere in any way with the switch unit even though considerable pull is exerted against the cord.

Another object of this invention is to provide a novel arrangement wherein the supply cord is connected to a switch unit which in turn is loosely mounted in a switch housing so as to be under no distorting strains such as might interfere with its smooth operation and in which the strain relief connection is so attached to the switch housing that no strain can be transmitted from the cord to the switch unit.

Another object is to provide in connection with such cord attachment means, a cord guard of novel construction which prevents sharp bending of the cord in the region of attachment to the switch, and thus guards against chafing and breaking of the cord.

Another object is to provide a novel construction wherein the strain relief means also serves as part of the means for retaining in proper position a switch actuator in the form of a ring encircling the handle of the cleaner.

With these and other objects in view our invention consists in the combination and construction and arrangement of the various parts thereof, whereby the objects contemplated are attained, as more fully set forth in the accompanying specifications, pointed out in our claims, and illustrated in the accompanying drawing, in which:

Fig. 1 is a side elevation of a sectional view embodying our invention.

Fig. 2 is a longitudinal sectional view through the device.

Fig. 3 is a plan view partly in section of the same.

Fig. 4 is a sectional view taken on the line 4—4 of Fig. 2.

Fig. 5 is a detail view partly in plan and partly in section of the motor cord connection.

Fig. 6 is a view similar to Fig. 3 of a modified form of the invention.

Fig. 7 is an end view of the motor cord socket.

The conventional type of suction cleaner in which the present invention is embodied comprises the blower case 10, a motor 11, a suction neck 12, a floor tool 13, floor wheels 14—15 attached to the floor tool and motor 11 respectively, a blower discharge pipe 16, a dust collector 17 connected thereto, a hollow handle 18 the end of which is detachably secured in a socket 19 formed on the blower case 10, a switch housing 20 secured to the handle 18 by means of a ring 21 formed integrally with the housing, a motor cord 22, and a supply cord 23 for plugging into a wall socket.

The switch housing 20 is open at each end, and its side walls are provided (Fig. 4) with channels 24 receiving a switch unit 25. The switch unit has the contact elements 26 and 27, the elements 26 being connected to brushes 28 and the elements 27 being connected to connector bars 29.

The respective ends of the wires composing the supply cord 23 are connected as at 30 to bus bars 29, and embedded in the butt 31, of a strain relief sleeve 32.

Formed integrally with the sleeve 32 is a cord guard 32a.

The guard 33 may be made of flexible material, preferably soft rubber, molded or vulcanized about the terminal portion of the supply cord 23. The bus bars 29 are molded into the butt 31, and diverge at a very substantial angle as shown. The butt 31 is correspondingly flared outwardly so as to be substantially frusto-conical in shape.

An anchor cap 33 of sheet metal, includes a frusto-conical collar 34 and a flange 35, the latter being secured by means of screws 36 to the upper end of the switch casing 20. The collar 34 snugly embraces the butt 31 of the strain relief sleeve, firmly anchoring the latter to the switch case.

The cord guard may be in the form of a coiled spring 32c, attached at one end to the cap 33, and encircling the cord 23. The strain relief sleeve 32d in this case may be any molded material of the required strength, whether flexible or not.

It will now be seen that any pull impressed upon the cord 23 will be transmitted first to the strain relief sleeve 32 in which the cord is firmly embedded, and from the butt of the latter to the anchor cap 33 and thence directly to the switch housing, and that the cap 33 will serve to position the switch unit 25 inside of the switch housing 20, the bus bars 29 allowing frequent connecting and disconnecting of the switch element, if desired, without being injured thereby as would the frayed ends of the wires. Each of the bus bars 29 has a lost motion connection with its respective switch element 27, comprising a screw 60, extended through a slot 61 in the bar, and threaded into the element 27. (Figs. 2 and 3.) The lost motion connection 60, 61 allows the switch unit to be adjusted to the correct position relative to the cap 33, i. e., with the ends of the side frame members of the switch unit in contact with or in closely adjacent relation to the flange of the cap, in which position the opposite ends of said side frame members will contact or lie closely adjacent the flange of the cap 49, but without any substantial pressure thereagainst. The switch unit is loosely received in the housing, i. e., it is not connected by screws, rivets or the like, its sole connection to the housing being such contact as it has with the channels 24 and end caps 49, 33, and the attachment to the bus bars 29. Thus the switch unit 25 may adjust itself to a position within the housing wherein it is under no strain, and consequently it will remain in condition to operate freely during an extended period of service. In view of the delicacy of the working parts of such a switch, this is a very important feature.

A bead 37 engages the edge of the collar 34 to prevent the sleeve 32 moving inwardly relative to the collar 34.

The extended tapering cord guard 32a, being made of soft rubber or the like, has an increasing flexibility toward its tip which allows it and its embedded cord to curve without producing a sharp bend in the cord. Thus the cord is guarded against sharp flexing such as to cause breaks in either the wire or the insulation. In this connection, the sleeve is drawn out to a thin portion 32b so that the flexibility of the sleeve at the termination thereof is substantially equal to the flexibility of the cord.

The switch lever 38 is operated by a finger 39 secured to a ring shaped actuator 40 of insulating material, rotatably associated with the housing ring 21 by means of a collar 41 formed integrally with the actuator 40 and rotatable within the flange 42 formed on the ring 21. The upper corner of the switch housing is cut away as at 63 (Fig. 3) to receive the lower extremity of the actuator 40, and the plate 35 is shaped arcuately to fit against the handle member 18a and rests snugly against the end face of the actuator 40. (Fig. 4.) A pin 43 is extended through the ring 21, through an elongated slot 64 in the flange 41 of the actuator, and thence into a lug 65 to hold the upper region of the actuator in position, the lower region being held by the flange 35 of the anchor cap.

The handle 18 is preferably made in two parts, the upper section 18a slipping into the lower section 18 and the joint being concealed beneath the ring 21. The latter is provided with an annular shoulder 66, which abuts against the end of the handle member 18.

On the upper end of the motor cord 22 is a male plug element 44 including the motor cord terminals 45 which coact with the switch brushes 28. The latter extend into recesses 46 in a socket member 47 of insulating material which is secured in the collar 48 of the lower end cap of the switch housing 20. The lower end cap has the flange 49 which is secured by screws 50 to the lower end of the switch housing.

It will thus be seen that the motor cord is provided with a separable connection with the switch, to allow detachment of the handle assembly for conversion of the cleaner into a hand type cleaner.

The switch unit 25 may be detached without removal of the plug 44 from its socket, or vice versa, the plug 44 may be removed without disturbing the switch unit.

The socket member 47 is made in halves as shown in Fig. 7, and secured by a screw 62, extending through the collar 48 and through both halves 47.

As an example of the sturdiness of construction which is secured from the present invention, it is possible to place a load of several hundred pounds between the cord and the cleaner handle, transmitting entirely through the strain relief device without in any way loosening any of the electrical connections.

Positioning the switch housing 20 below the handle 18, gives the following advantages:

1. The motor cord 22 may lie directly beneath the handle and enter the switch housing in a straight line.

2. The housing may serve as a fixed support from which the dust collector 17 may be suspended at its upper end as shown.

2. It is in the most convenient and protected position.

4. The current supply cord 23 is below the wrist of the operator so as not to interfere with operation of the cleaner.

We claim as our invention:

1. In an electrical current conducting assembly of a type including a self-contained electrical unit having parts mechanically movable relative to each other, mounted on an ambulant mechanism, and supplied with current by a conductor adapted to inflict pulling strains as a result of ambulant movement of said mechanism; the combination of said conductor, said unit, a housing having an opening through which said unit is removable, said housing being attached to said mechanism, a cap on which the unit is mounted for insertion in or removal from the housing, means securing the cap to the housing covering said opening, and a pair of conductors mounted in said cap, constituting the means for mounting the unit on the cap, and serving also to carry current to said unit.

2. In an assembly of a type including a self contained mechanically operating electrical unit, a housing having an opening through which said unit is receivable, and a strain relief sleeve on which the unit is mounted for insertion in or removal from the housing, the combination therewith of a pair of conductors embedded in said strain relief sleeve, constituting the means for mounting the unit on the strain relief sleeve and serving also to carry current to the unit, said sleeve substantially covering said opening, and means securing the sleeve to the housing.

3. In an assembly of a type including a self contained mechanically operating electrical unit, a housing having an opening through which said unit is receivable, and a strain relief sleeve on which the unit is mounted for insertion in or removal from the housing, the combination therewith of a pair of conductors embedded in said strain relief sleeve, constituting the means for mounting the unit on the strain relief sleeve and serving also to carry current to the unit, said sleeve substantially covering said opening, and means securing the sleeve to the housing, the unit being loosely mounted in the housing so as to be free from strain.

4. In combination, a casing having an opening, a mechanically operating electrical unit loosely received therein and removable through said opening, a current supply cord, a strain relief sleeve in which the terminal portion of said cord is securely anchored, bus bars molded into said sleeve, providing electrical connection between the ends of the cord and the unit and constituting means for mounting the unit on the sleeve, and means connecting said sleeve securely to said casing over said opening.

5. In combination, a conductor cord, a strain relief sleeve of flexible rubber vulcanized around the end portion of said cord in the form of a frusto conical butt, and continued to form a tapering cord guard through which the cord extends, an anchor cap for attachment to a support, said cap being provided with a frusto-conical collar snugly receiving said butt and terminating in a constricted mouth, at the junction between the butt and the cord guard, and an annular bead formed on the sleeve, said mouth being engaged between said bead and the butt.

6. In combination with a self contained mechanically operating electrical unit, a housing having an opening through which said unit is removable and interiorly formed to receive and position said unit against displacement laterally of the axis of said opening, means carried by the housing to engage the end of the unit opposite the opening, a cap secured to the housing over said opening and engageable with the other end of the unit, a strain relief sleeve of insulating material mounted in the cap, a pair of rigid conductors mounted in said sleeve and forming, together with said sleeve and cap, the sole physical connection between the housing and the unit, and a current carrying cord anchored in said sleeve and connected to said conductors.

7. In combination, a housing, a self contained mechanically operating electrical unit in the housing, a current supply cord, a strain relief sleeve in which the terminal portion of said cord is securely anchored, bus bars molded into said sleeve and secured to the respective ends of said cord, lost motion connections between the opposite ends of the bus bars and said unit, and means connecting said sleeve securely to said housing.

8. In combination, a housing having an open end, a current supply cord, a strain relief sleeve of flexible rubber vulcanized around the end portion of said cord in the form of a frusto-conical butt, and continued to form a tapering cord guard through which the cord extends, an anchor cap secured to the housing over said opening and provided with a frusto-conical collar snugly receiving said butt and terminating in a constricted mouth, at the junction between the butt and the cord guard, and an annular bead formed on the sleeve, said mouth being engaged between said bead and the butt.

FREDERICK RIEBEL, Jr.
DEWEY M. DOW.